United States Patent [19]

Alfons

[11] Patent Number: 4,983,355

[45] Date of Patent: Jan. 8, 1991

[54] SEAL ELEMENT OF HARD MATERIAL SINTERED FROM A SEMI-FINISHED FORM WITH ORGANIC BINDER

[75] Inventor: R. Knapp Alfons, Biberach/Riss, Fed. Rep. of Germany

[73] Assignee: Masco Corporation of Indiana, Indianapolis, Ind.

[21] Appl. No.: 414,965

[22] Filed: Oct. 2, 1989

Related U.S. Application Data

[62] Division of Ser. No. 297,279, Jul. 15, 1988.

[30] Foreign Application Priority Data

Dec. 3, 1986 [IT] Italy ............................... 67899 A/86

[51] Int. Cl.$^5$ ............................................... B22F 3/00
[52] U.S. Cl. ........................................ 419/26; 419/28; 419/36; 419/37; 264/62; 264/63
[58] Field of Search ..................... 419/36, 37, 26, 27; 264/62, 63

[56] References Cited

U.S. PATENT DOCUMENTS 3,909,310 9/1975 Uy ....................................... 148/11.5
3,981,062 9/1976 Moskowitz et al. ............... 29/182.7
4,280,841 7/1981 Ito et al. ............................... 75/203

Primary Examiner—Stephen J. Lechert, Jr.
Assistant Examiner—Nina Bhat
Attorney, Agent, or Firm—Edgar A. Zarins; Malcom L. Sutherland

[57] ABSTRACT

A seal elements of hard material for use, for instance, as a pair of small plates which form the parts to control the fluid flow through a faucet. The seal is constructed of a hard material—a metal, a metallic oxide, a metallic carbide, a metallic nitride, a ceramic or glassy material—which is sintered from a semi-finished product obtained by mixing a powder of fine particle size of the aforementioned hard materials with an organic binder—a plastic material, a wax, or a combination of these substances. This mixture is formed under compression in a mold and, eventually, at least some of the binder is eliminated. The seal can emerge already finished from the sintering operation, or it can be subjected to some other treatment of its surface, that is, it can be lapped or it can be treated galvanically or it can be covered with a thin layer of a harder material—silicon carbide or another metallic carbide, a metallic nitride, or carbon with a cubic crystallographic lattice structure—applied by physical or chemical vapor deposition.

18 Claims, No Drawings

SEAL ELEMENT OF HARD MATERIAL SINTERED FROM A SEMI-FINISHED FORM WITH ORGANIC BINDER

This is a divisional of co-pending application Ser. No. 297,279 filed on July 15, 1988.

BACKGROUND OF THE INVENTION

I. Field of the Invention

The present invention relates to the seal elements of hard material of the type in which the seal is made through the precise finishing of the parts themselves. These seal elements are movably installed in direct mutual contact without the interposition of a pliable gasket. Some examples of seal members of this type can be found in the small plates of hard material of faucets, in industrial valves, in the injection pumps of diesel engines, etc. Above all, the following will refer to the case, which is particularly significant, of the small plates for faucets; however, this does not mean that there should be any limitations put on the range of applications of the invention.

II. Description of the Prior Art

The small plates of hard material, used in the regulation of the fluid flow in the faucets for hydraulic systems, are usually made with oxides or silicates of sintered aluminum and then lapped until reflective with a roughness of approximately 0.2 to 0.7 microns. Because of this very precise surfacing treatment, such small plates make up the parts which are suitable for the regulation and interception of the flow of water. Further, because of their hardness, which is o the order of 23,000 N/mm, they last a long time and are able to expel foreign material, even hard material such as granules of sand, which come in contact with them without causing damages. However, the usual processes of sinterization used for this purpose do not allow the small plates of hard material to take on complex forms, for example, having serrations, gear cuttings, comb-like conformations, sub-squarings, or considerable variations of thickness which, in certain cases, could be quite useful. In the past, when such complex configurations were required, one was forced to match a small metal plate of hard material, to which is delegated the function of interception, with an element formed from plastic which has the complex forms needed and which cooperates with the small metal plate of hard material in the intermediate conditions of closing. However, such assemblies, besides offering some assemblage complications, cannot reach the efficiency level that would be offered from a small plate of hard material which in itself has the desired configurations.

Analogous problems are present when similar plates are made of silicon carbide or of tungsten, or of similar materials. It has also been proposed to make the small plates for faucets with a material which is, at least, moderately hard, which, in this case, could be metallic, layered on its operative surface with a harder material—a metallic carbide, a metallic nitride, or carbon with a cubic crystallographic lattice structure—applied through physical or chemical vapor deposition. In this case, the metallic body of the small plate could be made, for example, in a technologically convenient way through shearing from a sheet of stainless steel. However, even in this case, serious limitations of feasible configurations are encountered. Although relatively complex forms can, in fact, be realized, counterbores or parts of varying thickness cannot be obtained.

Some analogous requirements to those facing the small plates of faucets can, in general, be applied to all other seal members made of hard material which are in direct mutual contact.

SUMMARY OF THE PRESENT INVENTION

In view of this situation, the object of the present invention is that of making some seal members of hard material that, with a reasonably limited cost of production and labor, can take on many even complicated configurations, including some complicated forms and/or some counterbores and/or parts of varying thickness.

This object can be reached, according to the present invention, by forming a seal member of hard material, of the type referred to above, through the sinterization of a semi-finished form obtained by compressing in a mold a mixture made from a fine powder of hard material, destined to make up the seal member; and from an organic binder of a plastic material, of wax, or of a mixture of these materials, and eventually eliminating, before the sinterization, at least part of the organic binder.

Other objects, features and advantages of the presention invention will be apparent by reference to the following description of a preferred embodiment.

DETAILED DESCRIPTION OF A PREFERRED EMBODIMENT OF THE PRESENT INVENTION

In the process of the present invention, one proceeds to mix a powder of hard material — having a granulometry which is very fine and proportionate to the final desired characteristics for the seal member — with an organic binder made of one or more plastic materials and/or waxes. The mixture is then used to form, by a standard molding machine, the semi-finished product which corresponds to the seal member being produced. In this operation, the final configuration and the roughness of the surface of the simi-finished product can be obtained with a corresponding treatment of the mold. In the semi-finished product produced this way, the organic binder is found mostly at the surface of the element and at least a part of it can be eliminated, if desired, by treatment with a solvent or by adequate heating. The semi-finished product is then subjected to the operation of sinterization, at a temperature chosen in relation to the composition of the hard materials. In the course of this operation, the remaining binder mixed with the hard material decomposes and in the sintered piece, only a small carbon residue, on the order of 0.01 to 0.03 parts per 1000 by weight, remains. This does not appreciably alter the characteristics of the hard materials and does not cause any inconvenience.

The described process which involves the metallurgy of powders using a technique of molding (eventually through injection) by the formation of a semi-finished product destined to then be sent on its way to sinterization, is in itself well known in the application to metallic powders. This process has been used for the production of machine parts and equipment, of arms, of medical instruments, and of parts of household appliances. From its application, formed pieces result which can have many configurations, even very complex ones, with different thicknesses and varying thickness from point to point, with counterbores and with sub-squarings, and which can have a considerably reduced surface roughness and a notable hardness.

From the research done by the Applicant, it has been found that the residual porosity of the pieces formed with this process ca be very much reduced. Therefore, the aforementioned procedure can be advantageously applied to the making of seal elements as described herein.

In the case in which the molding is done by an injection technique, the organic binder is preferably added to the powder of hard material in the smallest quantity necessary, because this mixture, when heated, offers a rheologic resistance adequate for an operation of injection into the mold. If, instead, the molding is done by compression in a mold without injection, the quantity of binder used is dictated only by the required cohesion of the semi-finished product.

By using a very precise and highly finished mold for the molding of the semi-finished product, a seal member made with this process can already emerge from the operation of sinterization with dimensional tolerances and with surface roughness sufficiently reduced to allow the piece to be used as is. Yet, it is possible to produce seal members with grades of precision and roughness which in themselves are not sufficient in relation to the foreseen application, and then perfecting the conditions at least of the operative surface of the seal members with a surface treatment, like lapping.

The metallurgic process of the powders with preventative forming through molding can be applied to a material which is hard enough in itself to be able to form the operative surface of the seal member. With this goal in mind, for example, a metallic carbide (of tungsten, silicon, titanium, or other similar substances) can be used. Furthermore, the process can also be applied to powder forms of materials not only made from metals or carbides, as it was up to now known; but, also made from other hard materials like oxides, glassy materials and other similar substances, which in themselves are suitable to form the operative surface of the seal member.

Moreover, it is possible to form the body of the seal members by using a material which is only moderately hard, having hardness which in itself is not sufficient to form the operative surface of the seal members. In this case, at least the operative surface of the seal members can be covered with a thin layer of material of greater hardness, made by means of galvanic treatment or by means of physical or chemical vapor deposition. Besides obtaining a greater hardness, a similar covering with a material of greater hardness can also be carried out in order to achieve the most advantageous friction coefficient, or a more perfect closure of the pores of the material on the operative surface.

Among the materials of greater hardness that can be deposited by means of a physical or a chemical vapor deposition include silicon carbide, the carbides and nitrides of metals especially of transition metals, and the form of carbon with a cubic crystallographic lattice.

There are many known processes for the physical or chemical deposition by vapor which can be used to obtain a layer of silicon carbide or of other materials of greater hardness. Among these processes, the ones that are particularly advantageous are CVD and PVD developed by the Battelle Institute. Therefore, in a way of carrying out the invention, a seal member is made with a material which is, at least, moderately hard, covered with material of greater hardness through one of the processes described.

An important advantage—adequately exploitable in the proposed application of the invention—of the layers of hard material deposited chemically or physically by vapor, is that they do not substantially modify the degree of finishing of the surfaces on which the deposition will take place. Therefore, the deposition of metal of greater hardness onto a seal member can be carried out with the operative surface of adequate precision, by the use of molds of corresponding precision, or it can be treated—for example, by lapping at a level of elevated finishing—before the deposition takes place, and thus, by working on a material that is sufficiently hard so that it can accept the foreseen finishing but not so hard that this operation is made difficult and expensive or wherein extensive equipment and special technology are needed for its fulfillment.

Naturally, the application of the invention can be independent of the form and number of the seal members used in the apparatus. Some seal members could be flat, or can make up bodies that have work surfaces which can be concave or convex; for example, parts of spheres or parts of cylinders.

The application of the invention permits the assurance of an optimal functioning of the apparatuses that use the seal members through the adoption of appropriate forms—even complex—of the seal members themselves. At the same time, the possibility of adopting complex configurations allows the realization of some known characteristics to facilitate the construction and the assemblage of the apparatuses using the seal members, and to attain complexity at a lower cost of production.

The invention has a particularly interesting application to valves and faucets, the most widespread type being the ones having essentially two little plates in the form of discs, also, those essentially having three little plates in the form of discs, or those having only one little plate in the form of a disc cooperating with one little plate in the form of a disc cooperating with other little plates with cylindrical form exposed to the fluid flow. Also, applications of the present invention can be made to faucets of the type in which the little plates are crossed in only one direction by the water which then flows into the body of the faucet or the valve cartridge. Further, they may also be of the type in which the water flows across the small metal plates, first in one direction and then in the opposite direction.

Especially in the cited application, a seal member, according to the invention, could be foreseen to cooperate with one or more other seal members of analogous composition, or even with seal members of different composition. In many cases, it is advantageous that the cooperation occurs between seal members that have differences of composition and/or surface finishing.

Nevertheless, the application to the valves and to faucets is not exclusive and, as aforementioned, other foreseen applications for the pair of seal members, according to invention, include industrial valves—especially those subjected to elevated temperatures and/or to the action of chemical products—and the valves and small pistons for the fuel injection pumps of diesel engines, and so on.

The foregoing detailed description has been given for clearness of understanding only and no unnecessary limitations should be understood therefrom as some modifications will be obvious to those skilled in the art without departing from the scope and spirit of the appended claims.

I claim:

1. A process for manufacturing a seal element of hard material comprising the steps of:
    molding a semi-finished seal form from a mixture made from a fine powder of hard material destined to constitute the seal element and an organic binder selected from the group consisting of a plastic material, a wax material, and a mixture of wax and plastic materials;
    applying a precise finish to said molded semi-finished seal form; and
    sinterizing said seal form.

2. The process as defined in claim 1 wherein said fine powder of hard material is selected from the group consisting of a metal, a metal oxide, a metalllic carbide, a metallic nitride, a ceramic, and a glass material.

3. The process as defined in claim 2 wherein said molding of the semi-finished seal is completed through injection molding.

4. The process as defined in claim 2 wherein at least some of said organic binder contained in said molded semi-finished seal element is eliminated prior to sinterization of said element by heating said semi-finished seal element.

5. The process as defined in claim 2 wherein at least some of said organic binder contained in said molded semi-finished seal element is eliminated prior to sinterization of said element by treatment of said semi-finished seal element with a solvent.

6. The process as defined in claim 2 wherein following sinterization of said seal form, said seal element is subjected to a treatment of surface superfinishing.

7. The process as defined in claim 6 wherein said precisely finished seal member is covered with a thin layer of material of greater hardness.

8. The process as defined in claim 7 wherein said layer material is selected from the group consisting of silicon carbide, metallic carbide, metallic nitride, and carbon with a cubic crystallographic lattice structure.

9. The process as defined in claim 8 wherein said layer material is applied through galvanic treatment.

10. A process for manufacturing a seal element of hard material for use as a fluid flow control plate of a faucet valve comprising the steps of:
    molding a semi-finished seal form from a mixture made from a fine powder of hard material destined to constitute the seal element and an organic binder;
    said fine powder of hard material selected from the group consisting of a metal, a metal oxide, a metallic carbide, a metallic nitride, a ceramic, and a glass material;
    said organic binder selected from the group consisting of a plastic material, a wax material, and a mixture of wax and plastic materials;
    applying a precise finish to said molded semi-finished seal form;
    eliminating at least some of said organic binder contained in said molded seal form; and
    sinterizing said molded seal form.

11. The process as defined in claim 10 wherein the molding of the semi-finished seal form is completed through injection molding.

12. The process as defined in claim 11 wherein said sinterized seal form is subjected to a treatment of surface superfinishing.

13. The process as defined in claim 12 wherein said superfinished seal is covered with a thin layer of material of greater hardness, said layer material selected from the group consisting of silicon carbide, metallic carbide, metallic nitride, and carbon with a cubic crystallographic lattice structure.

14. A process for manufacturing a seal element of hard material for use as a fluid flow control plate of a faucet valve comprising the steps of:
    molding a semi-finished seal form from a mixture made from a fine powder of hard material destined to constitute the seal element and an organic binder for maintaining said fine powder in said semi-finished seal form;
    applying a precise finish to said molded semi-finished seal form;
    eliminating at least some of said organic binder contained in said molded seal form;
    sinterizing said molded seal form; and
    applying a thin layer of material of greater hardness to said seal form.

15. The process as defined in claim 14 wherein said fine powder of hard material is selected from the group consisting of a metal, a metal oxide, a metallic carbide, a metallic nitride, a ceramic and a glass material.

16. The process as defined in claim 15 wherein said organic binder is selected from the group consisting of a plastic material, a wax material, and a mixture of wax and plastic materials.

17. The process as defined in claim 16 wherein said layer material is selected from the group consisting of silicon carbide, metallic carbide, metallic nitride, and carbon with a cubic crystallographic lattice structure.

18. The process as defined in claim 14 wherein said sinterized seal form is subjected to a treatment of surface superfinishing.

* * * * *